(12) United States Patent
Huang

(10) Patent No.: US 11,524,372 B1
(45) Date of Patent: Dec. 13, 2022

(54) METHOD FOR MAKING A REEL ASSEMBLY OF A TIE-DOWN

(71) Applicant: Han-Ching Huang, Taichung (TW)

(72) Inventor: Han-Ching Huang, Taichung (TW)

( * ) Notice: Subject to any disclaimer, the term of this patent is extended or adjusted under 35 U.S.C. 154(b) by 0 days.

(21) Appl. No.: 17/384,797

(22) Filed: Jul. 25, 2021

(51) Int. Cl.
| | | |
|---|---|---|
| *B21D 28/26* | (2006.01) | |
| *B65H 75/50* | (2006.01) | |
| *B23K 31/02* | (2006.01) | |
| *B23P 15/14* | (2006.01) | |
| *B60P 7/08* | (2006.01) | |

(52) U.S. Cl.
CPC ............. *B23P 15/14* (2013.01); *B21D 28/26* (2013.01); *B23K 31/02* (2013.01); *B65H 75/50* (2013.01); *B60P 7/0846* (2013.01)

(58) Field of Classification Search
CPC ......... B23P 15/14; B21D 28/26; B23K 31/02; B65H 75/50; B60P 7/0846
See application file for complete search history.

(56) References Cited

U.S. PATENT DOCUMENTS

| | | | | | |
|---|---|---|---|---|---|
| 5,369,848 | A | * | 12/1994 | Huang | .................. A44B 11/125 24/68 CD |
| 7,350,767 | B2 | * | 4/2008 | Huang | .................... B60P 7/083 254/218 |
| 7,874,047 | B2 | * | 1/2011 | Breeden | ................... B60P 7/083 24/68 CD |
| 2006/0261204 | A1 | * | 11/2006 | Ruan | ....................... B60P 7/083 242/388.4 |
| 2012/0233824 | A1 | * | 9/2012 | Breeden | ................ B60P 7/0823 24/68 CD |
| 2014/0263791 | A1 | * | 9/2014 | Sabtu | .................... A01K 89/015 242/224 |
| 2020/0346576 | A1 | * | 11/2020 | Maners | ................... B60P 7/083 |

\* cited by examiner

*Primary Examiner* — Lee A Holly
(74) *Attorney, Agent, or Firm* — Bruce Stone LLP; Joseph A. Bruce

(57) ABSTRACT

A method is executed to make a reel assembly of a tie-down. The method includes the steps of providing a ratchet with teeth and slots, providing a spool with protuberances, connecting the ratchet to the spool by inserting the protuberances of the ratchets in the slots of the spool, and enhancing the connection of the ratchet to the spool.

9 Claims, 5 Drawing Sheets

METHOD FOR MAKING A REEL ASSEMBLY OF A TIE-DOWN

BACKGROUND OF INVENTION

1. Field of Invention

The present invention relates to a tie-down and, more particularly, to a method for making a reel assembly of a tie-down.

2. Related Prior Art

U.S. Pat. No. 7,350,767 discloses a tie-down including a frame 10, an axle 13, two detents 14 and 23, a handle 20, a reel assembly 30, an automatic reeling device 40, a short belt 90, and a long belt 91. An end of the short belt 90 is connected to the frame 10. Another end of the short belt 90 is connected to a hook. The handle 20 includes two cams 21. The automatic reeling device 40 includes a coil spring 41 inserted in a casing that consists of two covers 42 and 43. The cover 43 is connected to an external side of one of two lateral plates 104 of the frame 10. The coil spring 41 includes an end connected to the cover 42 and another end connected to the axle 13. The reel assembly 30 is supported on the axle 13, which extends through the cover 43, the lateral plates 104 and the cams 21. The reel assembly 30 includes two ratchets 32 connected to two ends of a spool 31. The reel assembly 30 is located between the lateral plates 104. Each of the cams 21 is located between one of the lateral plates 104 and one of the ratchets 32. An end of the long belt 91 is connected to the axle 13, which extends through the spool 31. Another end of the long belt 91 is connected to another hook. The coil spring 41 is loaded as the long belt 91 is unreeled from the spool 31. When the long belt 91 is released, the coil spring 41 automatically reels the long belt 91 onto the spool 31, thereby moving the related hook toward the reel assembly 30. The detent 14 is supported on the lateral plates 104, biased toward the reel assembly 30 by a spring. Normally, the detent 14 is engaged with the ratchets 32 to stop reeling the long belt 91 onto the spool 31. The detent 23 is supported on the handle 20, biased toward the lateral plates 104 by another spring so that the detent 23 is engaged with the ratchets 32. When the handle 20 is pivoted relative to the frame 10, the detent 23 rotates the ratchets 32 to reel the long belt 91 onto the reel assembly 30 in a manual mode. The inclined edges of some of the teeth of the ratchets 32 push the detent 14 away to allow the ratchets 32 (the reel assembly 30) to spin relative to the frame 10. The upright edges of some of the teeth of the ratchets 32 are engaged with the detent 14 to prevent the coil spring 41 from rotating the reel assembly 30 in an opposite direction.

To make the reel assembly 30, the spool 31 includes two groups of protuberances respectively extending from two ends in a longitudinal direction. Each of the ratchets 32 includes a group of apertures. Each of the groups of protuberances is fitted in the group of apertures of one of the ratchets 32 by a process similar to riveting. It is expected to keep the spool 31 connected to the ratchets 32.

In use, the hooks are operated to hook portions of a truck or a container for example. The tie-down is operated to reel the long belt 91 onto the reel assembly 30, thereby stressing the long belt 91 and the short belt 90 to tie goods. The ratchets 32 are loaded by the detent 23, which is supported on the handle 20. The spool 31 is loaded by the long belt 91. There is a tendency to disconnect the spool 31 from the ratchets 32. The fitting of the protuberances in the apertures is not enough to keep the spool 31 connected to the spool 31.

The present invention is therefore intended to obviate or at least alleviate the problems encountered in the prior art.

SUMMARY OF INVENTION

It is the objective of the present invention to provide a method for making a reliable reel assembly of a tie-down.

To achieve the foregoing objectives, the method includes the steps of providing a ratchet with teeth and slots, providing a spool with protuberances, connecting the ratchet to the spool by inserting the protuberances of the ratchets in the slots of the spool, and enhancing the connection of the ratchet to the spool.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
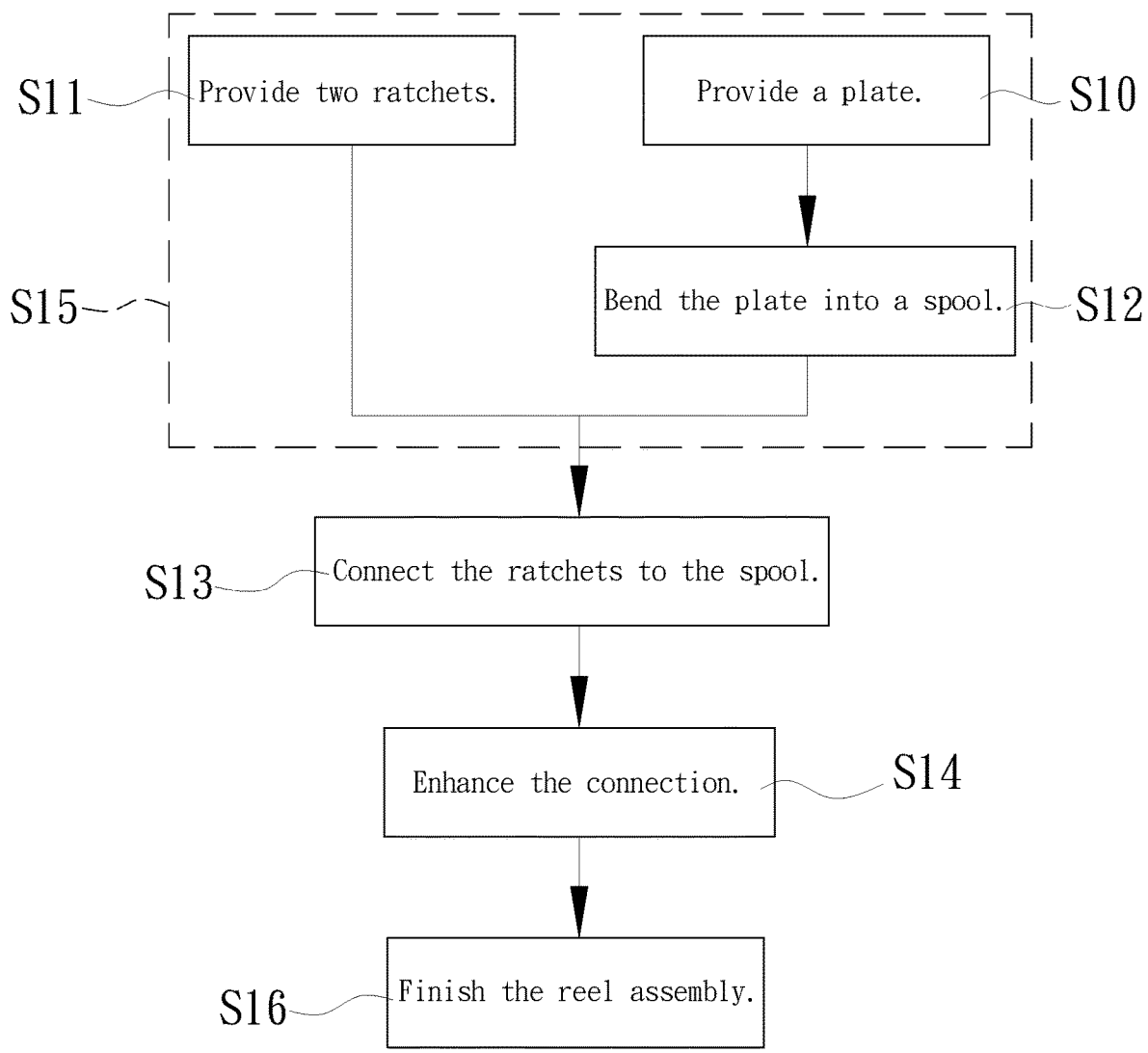
FIG. 1 is a flow chart of a method for making a reel assembly of a tie-down according to the preferred embodiment of the present invention.

Referring to FIG. 1, a method is executed to make a reliable reel assembly 30 (FIG. 5) of a tied-down according to the preferred embodiment of the present invention. At S15, elements or parts of the reel assembly 30 are provided. At S13, the reel assembly 30 is assembled by connecting the elements to one another. At S14, the connection of the elements to one another is enhanced to render the reel assembly 30 robust and hence reliable. At S16, the reel assembly 30 is finished.

Figure 2:
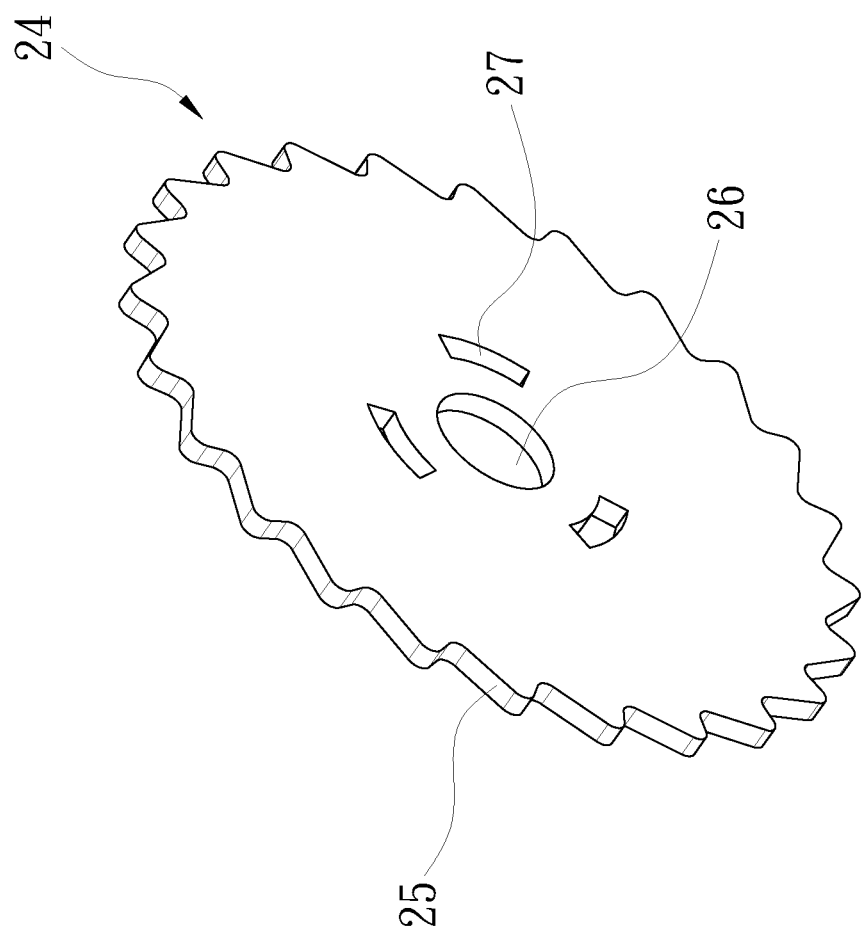
FIG. 2 is a perspective exploded view of one of two ratchets of a reel assembly to be made by the method shown in FIG. 1.

Referring to FIGS. 1 and 2, at S11, each of the ratchets 24 is made by punching a metal sheet. Multiple ratchets 24 can be made by punching one metal sheet or multiple metal sheets. Each of the ratchets 24 includes multiple teeth 25, a central aperture 26 and multiple slots 27. The teeth 25 are arranged along the edge of each of the ratchets 24. Obviously, the central aperture 26 is located at a center of each of the ratchets 24. The slots 27 are located between the teeth 25 and the central aperture 26. The slots 27 are at a same distance from the center of each of the ratchets 24. The slots 27 are arcuate. Preferably, the slots 27 are arranged evenly around the center of each of the ratchets 24.

Figure 3:
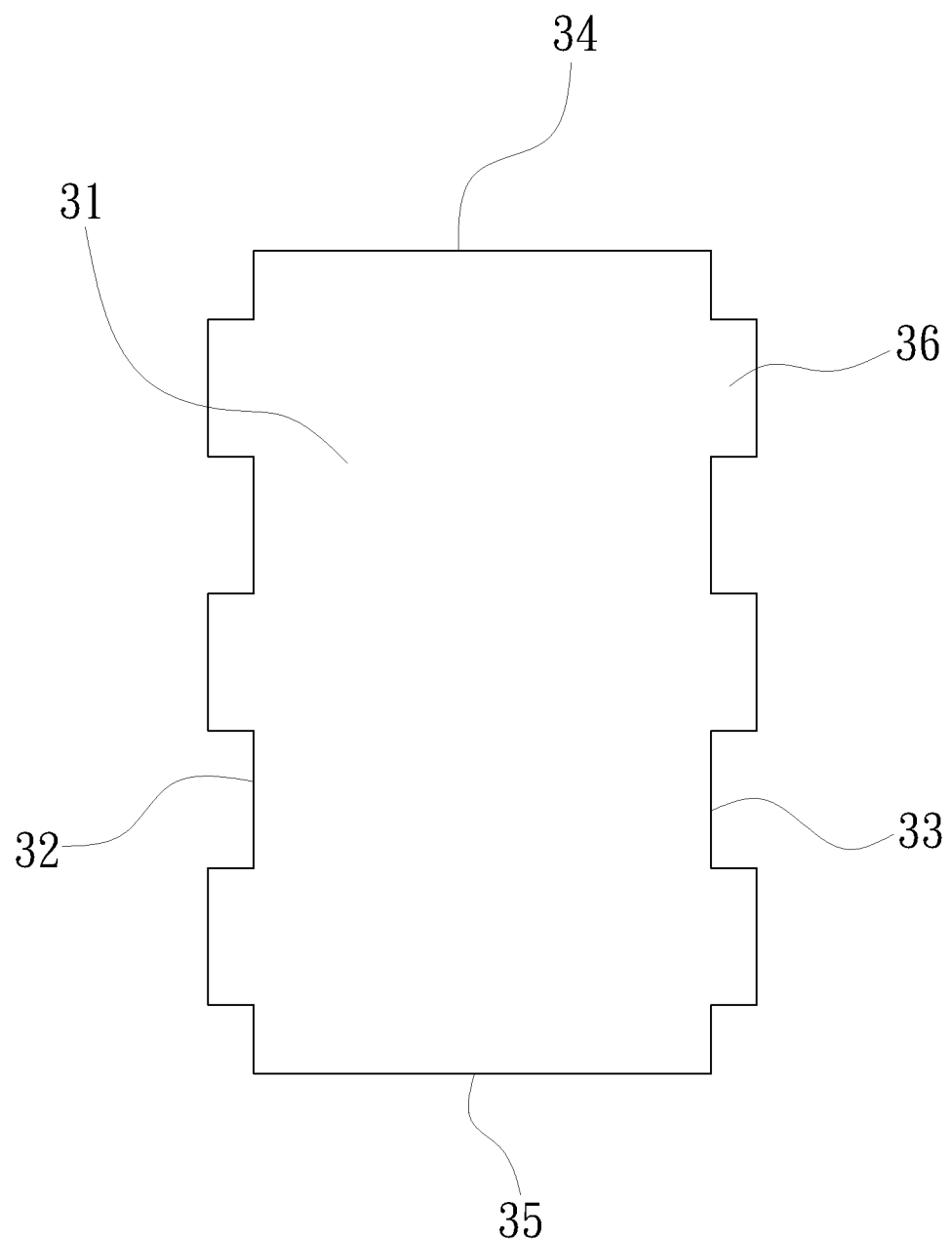
FIG. 3 is a top view of a metal plate used to make a spool of a reel assembly to be made by the method shown in FIG. 1.

Referring to FIGS. 1 and 3, at S10, a plate 31 is made by punching a metal sheet. The plate 31 is a rectangular plate including two longer edges 32 and 33 and two shorter edges 34 and 35. In the preferred embodiment, a group of protuberances 36 extends from each of the longer edges 32 and 33. In each of the groups, the protuberances 36 are evenly distributed along one of the longer edges 32 and 33. In another embodiment, a group of protuberances 36 extends from only one of the longer edges 32 and 33. Hence, the reel assembly 30 includes only one ratchet 24.

Figure 4:
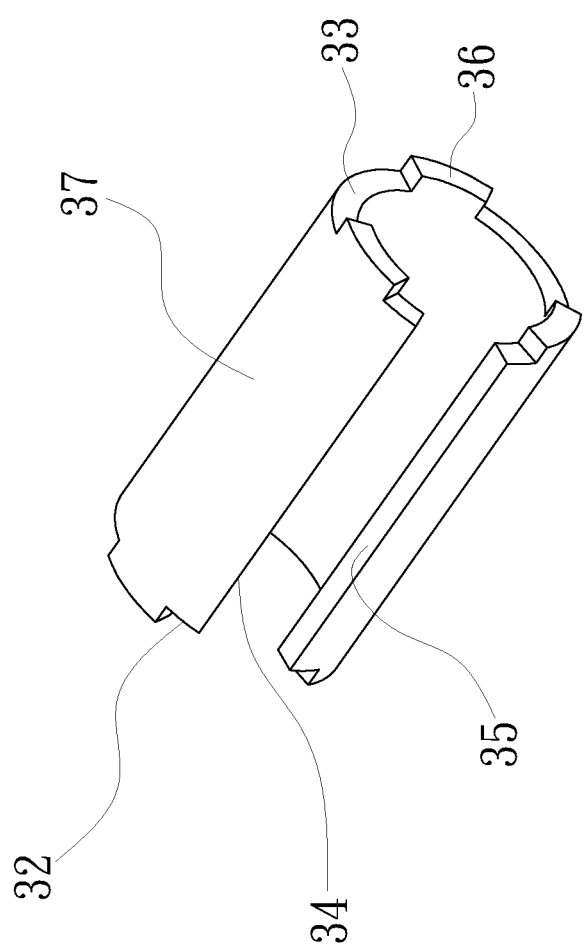
FIG. 4 is a perspective view of a spool made of the metal plate shown in FIG. 3.

Referring to FIGS. 1 and 4, at S12, a spool 37 is made by bending the plate 31. The bend of the plate 31 can be executed by rolling, pressing or by any other proper mechanical means. The spool 37 is C-shaped when it is viewed at an end. There is a slit (not numbered) between the shorter edges 34 and 35. The protuberances 36 are arcuate.

The provision of the plate 31 (S10) is executed before the bending of the plate 31 (S12). However, the provision of the spool 37 (S10 and S12) can be executed after, before or synchronously with the provision of the ratchets 24. The ratchets 24 and the spool 37 are separate elements before they are connected to one another.

Figure 5:
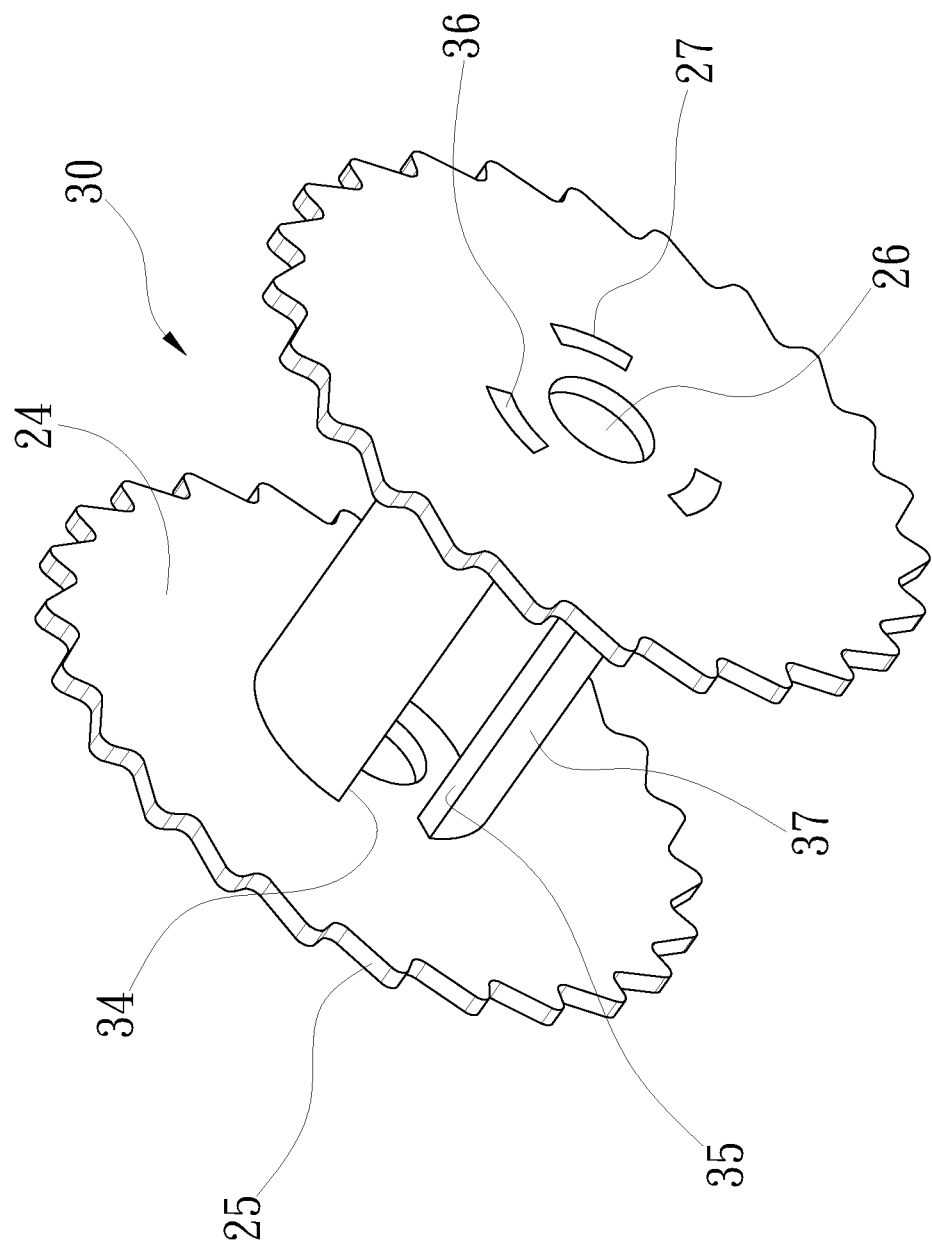
FIG. 5 is a perspective exploded view of a reel assembly made by the method shown in FIG. 1.

Referring to FIGS. 1 and 5, at S13, the protuberances 36 are fitted in the slots 27. To this end, the protuberances 36 are enlarged by pressing or hammering after they are inserted in the slots 27. Thus, the ratchets 24 are connected to the spool 37, thereby providing the reel assembly 30.

At S14, the connection of the ratchets 24 to the spool 37 is enhanced by welding, soldering, adhesion or any other proper means. In the preferred embodiment, welding is executed to enhance the connection of the ratchets 24 to the spool 37. During the welding, argon is used to avoid air in the atmosphere from comprising the quality of the welding. During the welding, each of the protuberances 36 and the periphery of the corresponding slot 27 are heated and molten before they are mixed with each other. After the welding, the mixture cools down and solidifies to enhance the connection of the ratchets 24 to the spool 37.

In another embodiment, soldering is executed to enhance the connection of the ratchets 24 to the spool 37. During the soldering, solder is heated and molten at an interface between each of the protuberances 36 and the corresponding slot 27. After the soldering, the solder cools down and solidifies to enhance the connection of the ratchets 24 to the spool 37.

In another embodiment, adhesion is executed to enhance the connection of the ratchets 24 to the spool 37. During the adhesion, adhesive is provided the interface between each of the protuberances 36 and the corresponding slot 27. Then, the adhesive cures to enhance the connection of the ratchets 24 to the spool 37.

At S16, the reel assembly 30 is finished. The finishing includes removing burrs, grinding, polishing, plating, spraying and/or by any other proper means.

After the finishing, the making of the reel assembly 30 is completed.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for making a reel assembly of a tie-down comprising the steps of:
    providing a ratchet with teeth and slots;
    providing a plate by punching a metal sheet; and
    bending the plate into a spool with protuberances;
    connecting the ratchet to the spool by inserting the protuberances of the spool in the slots of the ratchet; and
    enhancing the connection of the ratchet to the spool.

2. The method according to claim 1, wherein the step of providing the plate comprises the steps of providing the plate with two shorter edges and two longer edges, wherein the protuberances extend from one of the longer edges.

3. The method according to claim 2, further comprising the step of leaving a slit between the shorter edges of the plate after the step of bending the plate into the spool.

4. The method according to claim 3, wherein the step of finishing the reel assembly comprises a step selected from the group consisting of burr-removing, grinding, polishing, plating and spraying.

5. The method according to claim 1, wherein the step of enhancing the connection of the ratchet to the spool comprises the step of welding.

6. The method according to claim 1, wherein the step of enhancing the connection of the ratchet to the spool comprises the step of soldering.

7. The method according to claim 1, wherein the step of enhancing the connection of the ratchet to the spool comprises the step of adhesion.

8. The method according to claim 1, wherein the step of providing the ratchet comprises the step of punching a metal sheet to provide the ratchet.

9. The method according to claim 1, further comprising the step of finishing the reel assembly.

* * * * *